United States Patent
Yeh et al.

(10) Patent No.: US 7,480,304 B2
(45) Date of Patent: Jan. 20, 2009

(54) PREDICTIVE CONGESTION MANAGEMENT IN A DATA COMMUNICATIONS SWITCH USING TRAFFIC AND SYSTEM STATISTICS

(75) Inventors: Chiang Yeh, Sierra Madre, CA (US); Bryan Dietz, Lake Forest, CA (US)

(73) Assignee: Alcatel Lucent, Paris (FR)

( * ) Notice: Subject to any disclaimer, the term of this patent is extended or adjusted under 35 U.S.C. 154(b) by 624 days.

(21) Appl. No.: 11/027,887

(22) Filed: Dec. 29, 2004

(65) Prior Publication Data

US 2006/0140119 A1 Jun. 29, 2006

(51) Int. Cl.
*H04L 12/28* (2006.01)

(52) U.S. Cl. .................. 370/398; 370/235; 370/359; 370/387; 370/429

(58) Field of Classification Search ............ 370/389, 370/232, 235, 359, 387, 388, 398, 395.21, 370/429
See application file for complete search history.

(56) References Cited

U.S. PATENT DOCUMENTS

| | | | |
|---|---|---|---|
| 5,029,164 A | 7/1991 | Goldstein et al. | |
| 5,315,586 A | 5/1994 | Charvillat | |
| 5,426,640 A * | 6/1995 | Hluchyj et al. | 370/235 |
| 5,448,559 A | 9/1995 | Hayter et al. | |
| 5,583,861 A | 12/1996 | Holden | |
| 5,825,748 A | 10/1998 | Barkey et al. | |
| 5,831,980 A * | 11/1998 | Varma et al. | 370/395.72 |
| 5,864,539 A * | 1/1999 | Yin | 370/236 |
| 6,157,613 A | 12/2000 | Watanabe et al. | |
| 6,252,877 B1 * | 6/2001 | Kozaki et al. | 370/399 |
| 6,396,807 B1 | 5/2002 | Peligry et al. | |
| 6,657,962 B1 * | 12/2003 | Barri et al. | 370/235 |
| 6,785,238 B1 | 8/2004 | Kago | |
| 7,197,044 B1 * | 3/2007 | Kadambi et al. | 370/418 |
| 7,292,580 B2 * | 11/2007 | Ramamurthy et al. | 370/395.42 |
| 2002/0034181 A1 | 3/2002 | Kalkunte | |
| 2003/0026525 A1 | 2/2003 | Alvarez | |
| 2004/0032827 A1 | 2/2004 | Hill et al. | |

* cited by examiner

*Primary Examiner*—Ricky Ngo
*Assistant Examiner*—Dewanda Samuel

(57) ABSTRACT

An apparatus and method for performing congestion management in a switch or router is disclosed. The apparatus acquires and or generates performance metrics for a plurality of switching module coupled via a switching fabric, generates a performance index based on the attributes from the switching modules, and allocates switching fabric bandwidth based on a weighted combination of the performance metrics. The performance metrics may include past and presents values of some attributes as well as predicted values.

11 Claims, 4 Drawing Sheets

PREDICTIVE CONGESTION MANAGEMENT IN A DATA COMMUNICATIONS SWITCH USING TRAFFIC AND SYSTEM STATISTICS

TECHNICAL FIELD

The invention generally relates to data communication switches adapted to perform congestion management. In particular, the invention relates to switches and routers adapted to acquire statistics and other attributes from a plurality of switch modules internal to the switch and allocate switch resources based on a weighted combination of those attributes.

BACKGROUND

The advent of high-speed standards—including 10 gigabits per second (Gbs) and 40 Gbps interfaces—for Ethernet switches and related network routing devices have presented significant challenges to network switch designers. Multiple network interfaces adapted to transmit at such high speeds place a tremendous burden on system resources, particularly the switching fabric. The switching fabric must support multiple lanes of traffic among its egress and ingress interfaces and accommodate traffic bursts. The relatively low interface speeds of preceding switches made it feasible to over-engineer the switching fabric, i.e., make the speed of switching fabric exceed the speed of the interfaces, for purposes of providing the necessary bandwidth. Presently, network switches may employ a switching fabric having a speed on the order of 50-100% greater than the individual interfaces. This practice, however, may be practically or physically impossible in the case of 10 Gbps and 40 Gbps interface speeds.

In view of the performance demands imposed on the switching fabric and switch resources more generally, effective congestion management is becoming increasingly important. Presently, congestion management within a network switch typically entails elaborate queuing operations at ingress and egress. Egress queuing, for example, can temporarily absorb bursts of traffic that exceed the maximum transmission rate of the egress interface. Egress queue capacity may, however, be exceeded where the rate of data accumulation exceeds the rate of data depletion for an extended period of time.

The problems associated with current congestion management approaches are more likely to occur in switches that permit data to be delivered directly to the switching fabric when data is present at ingress and bandwidth available on the switching fabric at that specific instant in time. Such systems allow data to be transmitted to egress regardless of the egress queues to accommodate the data, thus increasing the chance that the data will be dropped at the egress queues. In addition, bursts of traffic can instantaneously consume all the capacity in the system, even where there is enough capacity in the system to handle these bursts if the transmission of data through the switching fabric was properly staggered.

There is therefore a need for a switch adapted to optimize throughput, reduce tail dropping, weigh the needs of different components competing for the same resources, rate the performance of the different components, selectively allocate fabric bandwidth, and anticipate future bandwidth requirements.

SUMMARY

The invention in the preferred embodiment features an apparatus and method for performing congestion management in a data communications switching device such as a switch or router. The switching device comprises a plurality of switching modules including a first switching module and a second switching module, a switching fabric operatively coupled to the plurality of switching modules, and a central management module. The central management module is adapted to acquire one or more attributes from the first switching module and the second switching module, generate a first performance index based on the one or more attributes from the first switching module and the second switching module, and grant a transmission request enabling the first switching module to transmit one or more protocol data units (PDUs) to an egress switching module of the plurality of switching modules through the switching fabric if the first performance index satisfies a bandwidth grant condition. The request is generally granted if the performance index satisfies a bandwidth grant condition such as a performance threshold. If a service permit is granted, the first ingress switching module is authorized to send an allotted amount of data during an allotted period.

In some embodiments, the second switching module is the egress switching module, thus making the grant dependent on one or more conditions present at the ingress and egress switching modules. In some embodiments, however, the second switching module is another ingress switching module, thus enabling the switching device to weigh the needs of different modules competing for the switching fabric and allocate bandwidth based on the present and past performance of those modules. In the preferred embodiment, the decision to grant bandwidth or other system resource is based on the attributes acquired from each of three of more switching modules.

The attributes are directly acquired from the switching modules or derived from those values acquired from the switching modules. The attributes in the preferred embodiment include, but are not limited to, ingress buffer depth, ingress priority queue depth, egress queue depth, idle network processor cycles, availability of bandwidth to access a forwarding table, availability of input buffer memory, priority of bandwidth request, bandwidth grant history, and bandwidth denial history. The resulting performance index is then a weighted combination of the one or more attributes directly or indirectly acquired from the modules. The performance index may also be based on the present value of attributes, one or more historical values of those attributes, as well as the predicted value of the attributes. Predicted values may be derived using any of a number of filters including a second order low pass filters, alpha-beta filters, lead-lag filters, lead-over-quadratic filters, and multiple point moving average filters.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

Figure 1:
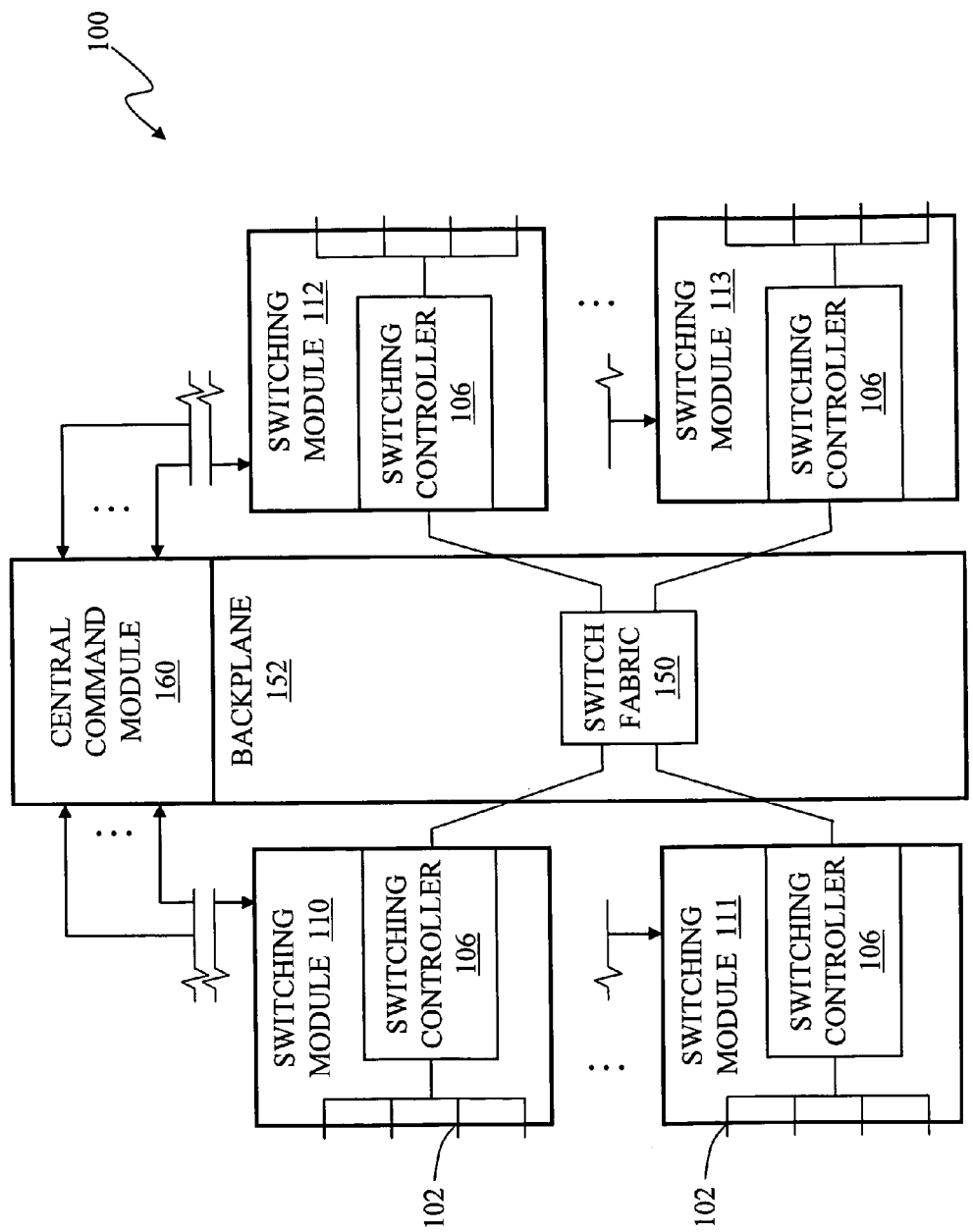
FIG. 1 is a functional block diagram of an enterprise switch adapted to perform predictive congestion management using feed-forward traffic statistics, in accordance with the preferred embodiment of the present invention.

Illustrated in FIG. 1 is a functional block diagram of an enterprise switch adapted to perform predictive congestion management (PCM) using feed-forward traffic statistics. The PCM switch 100 preferably comprises a plurality of switching modules 110-113, sometimes referred to as blades, which are seated into slots in a backplane 152. Each of the PCM switching modules 110-113 includes one or more external data ports 102 and one or more switching controllers 106. The data ports 102 of the different modules 110-113 are operatively coupled within the PCM switch 100 via a switching fabric 150. Each of the data ports 102 may be operably coupled to another node in the data communications network including one or more local area networks (LANs), wide area networks (WANs), metropolitan area networks (MANs), or the Internet, or a combination thereof, for example. The one or more switching controllers 106 capable of, but not limited to, at least Layer 2 (Data Link) switching and/or Layer 3 (Network) routing operations as defined in the Open Systems Interconnect (OSI) network model.

For purposes of this embodiment, PDUs flowing into a switching module 110-113 from an external port 102 towards the fabric 150 are referred to herein as ingress PDUs. The switching module through which an ingress PDU propagates is referred to as the ingress switching module. In contrast, PDUs flowing away from the fabric 150 to an external port 102 are referred to as egress PDUs. The switching module through which an egress PDU propagates is referred to as an egress switching module. Each of the plurality of switching modules of the preferred embodiment may serve as both an ingress switching module and an egress switching module for purposes of different flows.

The enterprise switch 100 of the preferred embodiment further includes a central command module (CMM) 160 for allocating bandwidth to transmit PDUs between the various switching modules 110-113. As described in more detail below, the bandwidth requests made by an ingress module may granted or denied based on various performance attributes including statistics and other metrics that characterize the various switching modules 110-113 as well as shared system resources including the switch fabric 150, for example. In the preferred embodiment, the CMM 160 is illustrated as a functional entity coupled to the various modules 110-113, although one of ordinary skill in the art will appreciate that the CMM 160 may be embodied in one of the plurality of switching modules 110-113, incorporated in the backplane 152, or in a separate management node.

Figure 2:
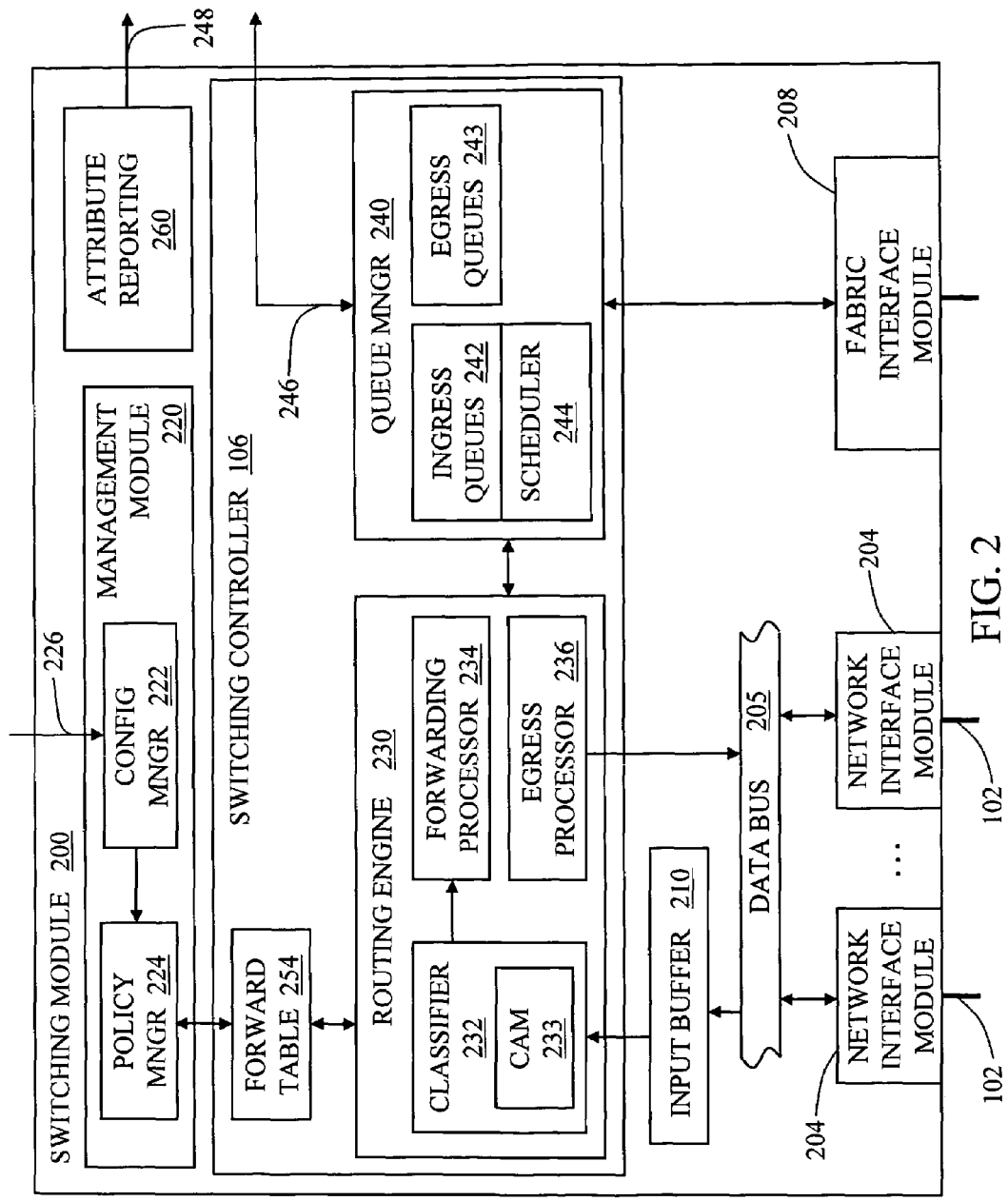
FIG. 2 is a functional block diagram of a switching module for performing predictive congestion management in the enterprise switch, in accordance with the preferred embodiment of the present invention.

Illustrated in FIG. 2 is a functional block diagram of a switching module 200 for performing PCM in the enterprise switch 100. The switching module 200 of the preferred embodiment, consistent with switching modules 110-113, comprises one or more network interface modules (NIMs) 204, a management module 220, one or more switching controllers 106, and a fabric interface module 208. Each of the NIMs 204 is operatively coupled to one or more external ports 102 for purposes of receiving ingress data traffic and transmitting egress data traffic. The ingress PDUs are conveyed to the switching controller 106 by means of one or more internal high-speed serial data buses 205 and one or more input buffers 210. The switching controller 106, preferably a network processor, classifies the ingress PDUs, performs any necessary forwarding operations assigned for execution at ingress, and enqueues the PDUs until bandwidth is available to transmit the PDUs to the appropriate one or more egress blades via the switching fabric 150.

The management module 220 preferably comprises a policy manager 224 for retaining and implementing traffic policies. The policies implemented by the policy manager 224 are preferably based in part on Open Systems Interconnect (OSI) network reference model Layer 2 (data link) and Layer 3 (network) addressing information derived from source learning operations, route information received from other routing devices in the network, and filtering rules uploaded by the network administrator via a configuration manager 222 using, for example, simple network management protocol (SNMP) messages 226. The traffic policies derived from source learning, other network nodes, and the administrator are made available to the routing engine 230 and collectively represented by the forwarding table 254. The forwarding table 254 is preferably a high speed random access memory (RAM) such as dynamic RAM (DRAM) or static (SRAM), for example.

The switching controller 106 of the preferred embodiment is adapted to perform Layer 2 switching operations and/or Layer 3 routing operations using PDU properties associated with OSI Layer 2 through Layer 7. The switching controller 106 preferably comprises a routing engine 230, a forwarding table 254, and a queue manager 240. The routing engine 230 comprises a classifier 232 and a forwarding processor 234. Ingress PDUs are classified into at least one of a plurality of flows using content addressable memory (CAM) 233 and classification rules retrieved form the forwarding table 254. The forwarding processor 234 executes one or more forwarding operations necessary to transmit the classified PDUs toward the appropriate external ports of the switching modules 110-113. The ingress PDUs processed by the forwarding processor 234 may be temporarily buffered in ingress priority queues 242 prior to transmission to the switching fabric 150 via a scheduler 244.

The forwarding processor 234 retrieves forwarding information associated with the ingress PDUs and executes one or more forwarding operations prior to transmission to the appropriate egress port or ports. The forwarding operations preferably include but are not limited to header transformation for re-encapsulating data, VLAN tag pushing for appending or prepending one or more VLAN tags to a PDU, VLAN tag popping for removing one or more VLAN tags from a PDU, quality of service (QoS) for reserving network resources, billing and accounting for monitoring customer traffic, Multi-Protocol Label Switching (MPLS) management, authentication for selectively filtering PDUs, access control, higher-layer learning including Address Resolution Protocol (ARP) control, port mirroring for reproducing and redirecting PDUs for traffic analysis, source learning, class of service (CoS) for determining the relative priority with which PDUs are to be allocated switch resources, color marking used for policing and traffic shaping, and inter-stack switch labeling management used to efficiently distribute PDUs between the switching modules 110-113 or other nodes in the network, for example.

In addition to the ingress processing described above, the routing engine 230 is also adapted to receive egress PDUs from the switching fabric 150 via a fabric interface module 208. In particular, PDUs received from the switching fabric 150 are temporarily buffered at the one or more egress queues and transmitted via an egress processor 236 of the routing engine 230 to a designated egress port 102 from among the NIMs 204. The switching controller 106 may perform one or more additional forwarding operations at egress prior to transmission to the appropriate egress port 102.

In accordance with some embodiments of the invention, the queue manager 240 preferably requests and is allotted bandwidth prior to transmitting one or more PDUs. In particular, the queue manager 240 sends a transmission request message 246 to the CMM 160 requesting switching fabric bandwidth and, if the requested granted, the one or more PDUs transmitted to the one or egress switching modules. The CMM 160 grants the requested bandwidth by issuing a service permit authorizing the ingress blade to send a specific amount of data to an egress blade during an allotted period. The CMM 160 determines whether to grant the bandwidth request based on performance metrics acquired from a plurality of switching modules including the ingress blade requesting the bandwidth and the egress blade to which the packets are destined as well as the metrics of one or more of the switching modules competing for bandwidth. In some embodiments, bandwidth may be granted on a per priority basis if the switch is adapted to recognize, for example, Quality of Service (QoS) classes and provision switch resources accordingly.

The performance metrics generated by a blade include a set of one or more attributes that characterize the performance of the blade as well as traffic patterns experienced by the blade. The attributes 248 may include the depth of each of the ingress priority queues 242, the depth of the egress queues 243, the number of idle network processor cycles accumulated by the switching controller 106 during a predetermined period of time, the availability of bandwidth for the controller 106 to access the forwarding table 254, and the availability of memory at the input buffer 210. In addition, the priority of the impending request for bandwidth or other service, as well as past history of bandwidth grants and denials for the service requester, may all be taken into consideration in determining the performance metric. The set of attributes may further include, for example, the mean, average, and variance associated with any of the attributes. The attributes associated with a blade are acquired and transmitted from an attribute reporting module 260 to the CMM 160 for each of the plurality of switching modules 110-113. Referring briefly to FIG. 1 again, the CMM 160 in some embodiments is also adapted to collect performance attributes from one or more shared system resources including the throughput of the switch fabric 150 as a function of time.

As discussed in more detail below, the CMM 160 may selectively grant and deny bandwidth requests from different blades based on a system-wide view of the switch 100 as opposed, for example, to the availability of queue memory at the egress switching module alone. The CMM 160 ultimately decides which requests to grant at any given time based on weighted combinations of attributes from a plurality of switching modules, thereby enabling the switch to fairly allocate bandwidth while optimize one or more operational criteria including throughput, for example.

Figure 3:
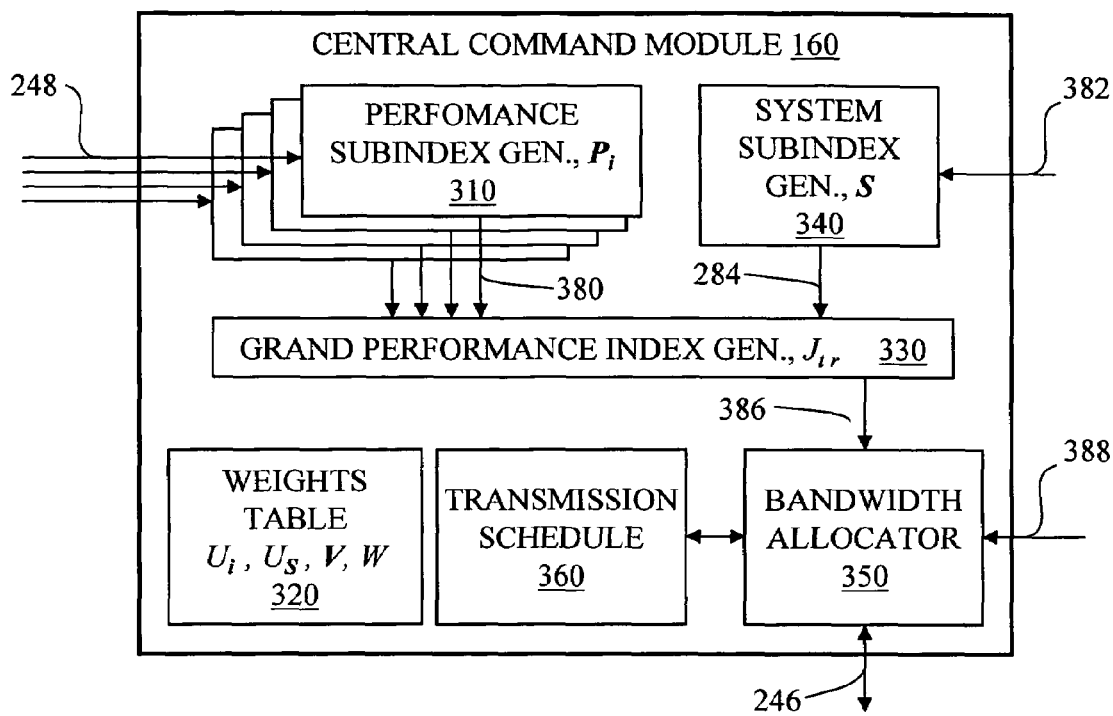
FIG. 3 is a functional block diagram of a central management module, in accordance with the preferred embodiment.

Illustrated in FIG. 3 is a functional block diagram of the CMM 160 in accordance with the preferred embodiment. The CMM 160 is adapted to receive one or more attributes from a plurality of switching modules, weight the attributes, generate one or more performance indexes characterizing systemic traffic and congestion conditions, grant requests for switching fabric bandwidth based on the performance indexes, thereby optimizing the switch's performance in accordance with the user-defined operational criteria. The CMM 160 in the preferred embodiment includes a performance subindex generator (PSG) 310 for each of the plurality of switching modules 110-113, a table 320 including the weights, a grand performance index generator (GPIG) 330 operatively coupled to each of the plurality of PSGs 310, and a bandwidth allocation 350.

The CMM 160 continuously monitors each of the switching modules 110-113 by retrieving the associated plurality of attributes 248 therefrom. Each set of attributes associated with one of the plurality of switching modules 110-113 is used by a PSG 310 to generate a performance subindex vector 380, $P_i$, which is a 1×N column vector whose magnitude characterizes the performance of the associated blade:

$$P_i = \sum_{n=1}^{N} u_{in} x_{in} \hat{x}_n \quad [1]$$

where $x_{in}$ is the nth attribute of a set of $N_i$ attributes associated with the ith switching module, $\hat{x}_n$ is the a unit vector associated with the nth attribute, and $u_{in}$ is the nth weight of a set of weights, $U_i$, retained in the weights table 320. In some embodiments, the CMM 160 further includes a system subindex generator 340 for generating a system performance subindex vector, $S$, compiled from one or more system attributes 382 (see FIG. 3) that characterize the switch's shared resources including the availability of bandwidth on the switching fabric 150. The system performance subindex vector is a 1×N column vector given by:

$$S = \sum_{m=1}^{M} u_{Sm} x_{Sm} \hat{x}_m \quad [2]$$

where $x_{Sm}$ the mth attribute of a set of M attributes associated with one or more shared resources, and $u_{Sm}$ is the nth weight of a set of weights, $U_S$, retained in the weights table 320. The two set of weights, $U_i$ and $U_S$, are used in the preferred embodiment to normalize the attributes, although they may also be used to disproportionately emphasize some attributes over others.

The performance subindex 380 associated with each of the blades 110-113 and the system subindex 284 are made available to the GPIG 330. In the preferred embodiment, the grand performance index, $J_{tr}$, is used by the CMM 160 to allocate bandwidth that enables the tth switching module to transmit data to the rth switching module through the switching fabric 150. The tth ingress switching module having data to transmit is referred to herein as a transmitting or sending switching module, while the rth egress switching module to which the data is transmitted is referred to as the receiving switching module. The switching modules whose attributes are included in the performance index but are not the sending or receiving blade are referred to as collateral switching modules.

In the preferred embodiment, a performance index determined for a particular pair of source switching module and receiving switching module is given by:

$$J_{tr} = \left\{ V_t^T P_t + V_r^T P_r + \sum_{i=1}^{I} [V_i^T P_i (1-\delta_{it})(1-\delta_{ir})] + V_S^T S \right\}$$

where $P_t$ is the performance index vector associated with the sending switching module requesting bandwidth, $P_r$ is the receiving switching module to which one or more PDUs are to be transmitted if a service permit is granted, $V_t^T$ is the transpose of a transmitter weight vector comprising a first set of weights applied to the performance index vector associated with the ingress blade, $V_r^T$ is the transpose of a receiver weight vector comprising a second set of weights applied to the performance index vector associated with the egress blade, $V_i^T$ is the transpose of a collateral weight vector comprising one or more additional sets of weights applied to the performance index vector associated with each of the remaining I blades whose performance may influence the decision by the CMM 160 to grant or deny a bandwidth request, $V_S^T$ is the transpose of a vector comprising a fourth set of weights applied to the performance index vector associated with the system of shared resources, and $\delta_{mn}$ is a Kronecker delta whose value is unity if m=n and zero if m≠n. The 1×N weight vectors $V_t$, $V_r$, $V_i$, and $V_S$ are defined by the user and retained in the weights table 320 where they are collectively represented by the vector V.

The switch module attributes 248 may include a number of metrics for quantifying various performance factors including the availability of resources within a blade including bandwidth resources, memory resources, data bus resources, and computational processing resources, for example. As one of ordinary skill in the art will appreciate, the weight vectors $V_t$, $V_r$, $V_i$, and $V_S$ are preferably defined by the user with different constituent weights to emphasize those attributes that are significant depending on whether role of the switching module, i.e., whether the particular switching module is the sending blade, the receiving blade, or a collateral blade. Assuming the set of attributes includes a metric specifying the availability of memory in an ingress queue 243, for example, the individual weights associated with the ingress and egress queues may differ between the transmitter weight vector $V_t$ and the receiver weight vector $V_r$. With respect to the transmitter weight vector $V_t$, availability of egress queue memory is generally weakly correlated with the ingress blade's ability to forward data, while the availability of egress queue memory is highly correlated to the egress blade's capacity to receive the forwarded data. The various weights associated with the weight vectors should be chosen accordingly.

In addition to the weighted performance indexes associated with a particular transmitter and receiver blades, the decision to grant a bandwidth request in the preferred embodiment may also be a function the performance of index of collateral switching modules. One or more collateral blades may severely impact the switch's performance if they are attempt to forward data to the same receiving blade concurrently, for example. The present switch 100 therefore accounts for conditions in which a collateral switching module may directly or indirectly impact the ability of the blade requesting bandwidth to transmit to the receiving switching module as well as the receiving module to process the data. In the preferred embodiment, the presence of data on collateral switching modules destined for the receiving switching module as well as competing bandwidth requests for bandwidth to receiving switching module may be monitored in the form of one or more attributes. When these attributes are properly weighted, the CMM 160 in the preferred embodiment may be adapted to deny a bandwidth request to transmit through the backplane if there are collateral switching modules that have higher priority data destined for the same receiving blade. In this manner, the switch 100 may avoid granting bandwidth to a requesting blade if a to do so would cause the high priority data in the collateral switch to be dropped at ingress or would cause the data from the requesting blade to be dropped at the receiving blade once the higher priority data from the collateral blade was received processed first.

In addition to the weighting of individual attributes by the using the weight vectors $V_t$, $V_r$, $V_i$, and $V_S$, a grand performance index may be generated by collectively weighting the sending switching module, the receiving switching module, and the collateral switching modules differently. The grand performance index may therefore be given by:

$$G_{tr} = \{W_t Q_t + W_r Q_r + W_k Q_k + W_s Q_s\} \quad [3]$$
where
$$Q_t = V_t^T P_t, \quad [4]$$
$$Q_r = V_r^T P_r, \quad [5]$$
$$Q_k = \sum_{i=1}^{I} [V_i^T P_i (1-\delta_{it})(1-\delta_{ir})], \quad [6]$$
$$Q_s = V_S^T S, \quad [7]$$

and where $W_t$ is a scalar weight used to scale up or scale down the weighted performance index associated with the transmitter switching module, $W_r$ is a scalar weight used to scale up or scale down the weighted performance index associated with the receiver switching module, $W_k$ is a scalar weight used to collectively scale up or scale down the weighted performance indexes associated with the collateral switching modules, and $W_s$ is a scalar weight used to scale up or scale down the weighted performance index associated with the shared resources.

The grand performance index $G_{tr}$, 386 associated with the ith transmit switching blade and the rth receiving blade may then be evaluated to determine if a condition warranting the grant of bandwidth has been satisfied. In the preferred embodiment, the grand performance index is compared to a performance threshold 388, for example. If the performance index is greater than the threshold 388 the bandwidth request is granted, otherwise the request denied. In the preferred embodiment, the performance threshold 388 is defined by the user although it may also be determined adaptively by monitoring bandwidth usage of the switching fabric 150 over time and varying the threshold accordingly.

In the preferred embodiment, weights applied to one or more attributes, performance indexes, or both may linear and nonlinear operators in addition to multiplicative weight values discussed above. The set of set of linear and non linear operators preferably includes threshold operators that evaluate to true or false, comparators that compare a given attribute to one or more other attributes of the same switching module or a different switching module, minimum and maximum operators that return, respectively, the lowest and highest value from among a set of values, and invert operators that returns 1/x.

In some embodiments of the invention, the switch 100 is further adapted to provide predictive congestion management. In particular, the switch 100 is adapted to maintain a historical record of the values of one or more attributes for the plurality of switching modules over time and subsequently weight those attributes for purposes of anticipating internal bandwidth requirements within the switch 100 and minimizing the adverse effects of congestion. The temporal weighting may take the form of a probabilistic filter including second order low pass filters, alpha-beta filters, lead-lag filters, or lead-over-quadratic filters.

In the preferred embodiment, a second order low pass filter is used to predict in—near real-time—the performance characteristics of the switch based the value of preceding values. If the attribute of interest were idle processor cycles at a switching controller 106, for example, a new attribute in the form of a second order low pass filter may be generated:

$$E(p) \cong \frac{\beta-1}{\beta} p(t) + \frac{1}{\beta} E\, p(t-1) \quad [8]$$

where p(t) is the percentage of available processor cycles in a current time interval, E(p) is the expectation value of idle processor cycles available in the next interval, and β is a user-defined number selected for weighting. Instead of an exponential moving average described above, some embodiments may also employ a multiple point moving average such as Spenser's formula known to those of ordinary skill in the art. As one skilled in the art will appreciate, the preferred embodiment may be adapted to anticipate critical traffic congestion and selectively restrict the amount of allotted bandwidth before resources expended.

In some embodiments employing predictive congestion management, the CMM 160 further includes a transmission schedule 360 retaining a time table specifying which switching modules are to be allotted bandwidth in the course of one or more future time intervals. The time interval may be, for example, digital processor cycle of the switching controller 106. The predicted traffic patterns and bandwidth requirements are used by the CMM 160 to identify periods of relatively high congestion in the transmission schedule—i.e., time slots where the bandwidth is insufficient to satisfy—and postpone one or more bandwidth requests, stagger bandwidth requests, or combine multiple bandwidth requests into a single grant.

Being aware of many transmission requests from a plurality of switching modules as well as past patterns of bandwidth usage, the CMM 160 may achieve a fair distribution of bandwidth between blades. For example, service grants allocating bandwidth may be denied to those blades with the highest rate of bandwidth consumption in favor of those with lower bandwidth consumption rates. The bandwidth may also be allocation, for example, using frame-based WFQ.

Figure 4:
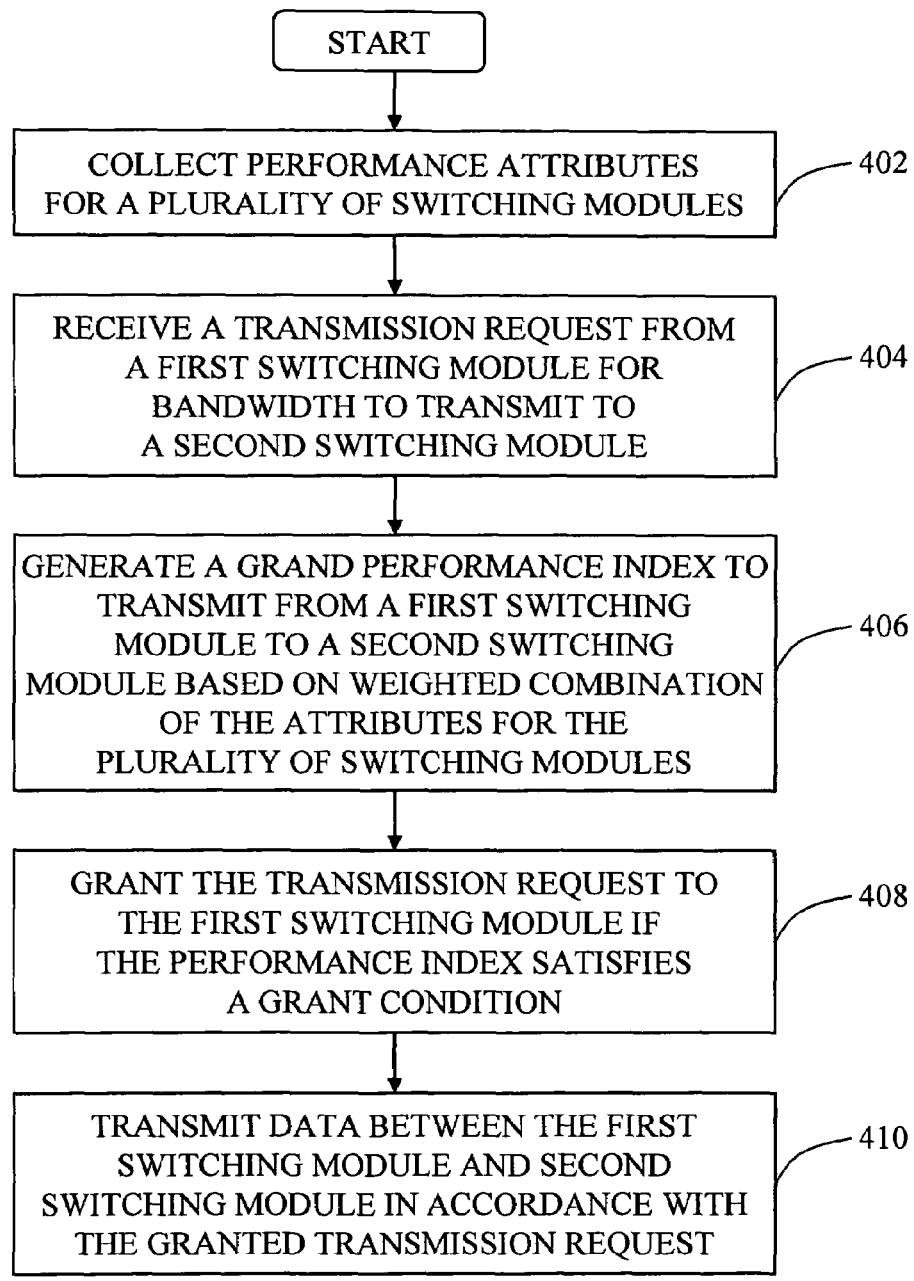
FIG. 4 is a flowchart of a method for performing predictive congestion management, in accordance with the preferred embodiment.

Illustrated in FIG. 4 is a flowchart of a method for PCM in an enterprise switching comprising a plurality of switching modules. In the preferred embodiment, a plurality of attributes are collected (step 402) from two or more switching modules, preferably three or more switching modules. One or more attributes associate with shared resources within the enterprise switch may also be collected. The attributes provide the basis to evaluate the performance of the various switching modules 110-113 as well as the switch 100 overall. When a request to transmit one or more PDUs from a port of the first switching module to a port of the second switching module is received (step 404) by a central management module, for example, a grand performance index is generated (step 406). The grand performance index—which is based on the attributes of at least two preferably three or more switching modules—is a weighted combination of the various attributes adapted to quantitatively characterize the current state of health of or congestion in the switch 100 or to predict the health of or congestion in the switch 100 in a predetermined period of time, preferably less than a second. The two or more switching modules providing the attributes on which the performance index is based preferably include a receiver switching module to which the one or more PDUs are to be transmitted if the request is granted, as well as one or more sending switching modules attempting to transmit PDUs to the target switching module. In some embodiments, the two or more switching modules associated with the attributes on which the grand performance index is based preferably include two or more switching modules requesting bandwidth to transmit to the same receiver switching module. If the performance index satisfies a bandwidth grant condition such as a predetermined threshold, the transmission request is granted (408) and the data transmitted (step 410) to the requesting switching module to the target switching module.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A switching device for performing congestion management in a data communications network, comprising: a plurality of switching modules comprising a first switching module and a second switching module; a switching fabric operatively coupled to the plurality of switching modules; and a central management module adapted to: acquire one or more attributes from the first switching module and the second switching module; generate a first performance index based on the one or more attributes from the first switching module and the second switching module; and grant a transmission request enabling the first switching module to transmit one or more protocol data units (PDUs) to an egress switching module of the plurality of switching modules through the switching fabric if the first performance index satisfies a bandwidth grant condition, wherein the first performance index comprises a weighted combination of the one or more attributes, wherein the first performance index comprises a predicted value of at least one of the one or more attributes, wherein the one or more attributes are filtered in accordance with a probabilistic filter selected from a group consisting of: a second order low pass filter, an alpha-beta filter, a lead-lag filter, a lead-over-quadratic filter, and a multiple point moving average filter.

2. The switching device in claim 1, wherein the second switching module is the egress switching module.

3. The switching device in claim 1, wherein the second switching module is an egress switching module.

4. The switching device in claim 1, wherein central management module is further adapted to: generate a second performance index based on the one or more attributes; and grant the transmission request enabling the second switching module to transmit one or more PDUs to said one of the plurality of switching modules if the second performance index, satisfies the bandwidth grant condition.

5. The switching device in claim 1, wherein the bandwidth grant condition is a performance index threshold.

6. The switching device in claim 1, wherein the one or more attributes is selected from the group consisting of: ingress priority queue depth, egress queue depth, idle network processor cycles, availability of bandwidth to access a forwarding table, availability of input buffer memory, priority of bandwidth request, bandwidth grant history, and bandwidth denial history.

7. A method for performing congestion management in a switching device comprising a plurality of switching modules end a switching fabric, the method comprising the steps of: acquiring one or more attributes from a first switching module and a second switching module of the plurality of switching modules; generating a first performance index based on the one or more attributes from the first switching module and the second switching module; and grant a transmission request enabling the first switching module to transmit one or more protocol data units (PDUs) to one of the plurality of switching modules through the switching fabric if the first performance index satisfies a bandwidth grant condition, wherein the first performance index comprises a weighted combination of the one or more attributes, wherein the first performance index comprises a predicted value of at least one of the one or more attributes, wherein the one or more attributes are filtered in accordance with a probabilistic filter selected from the group consisting of: a second order low pass filter, an alpha-beta filter, a lead-lag filter, and a lead-over-quadratic filter.

8. The method in claim 7, wherein the method further includes the steps of: generating a second performance index based on the one or more attributes; and granting the transmission request enabling the second switching module to transmit one or more PDUs to said one of the plurality of switching modules if the second performance index satisfies the bandwidth grant condition.

9. The method in claim 7, wherein the bandwidth grant condition is a performance index threshold.

10. A switching device for performing congestion management in a data communications network, comprising: a plurality of switching modules comprising a first switching module; a switch resource accessible to each of the plurality of switching modules; and a central management module adapted to: receive a request for the switch resource from the first switching module; acquire one or more attributes from each of the plurality of switching modules; generate a performance index based on the one or more attributes from each of the plurality of switching modules; and grant the request for the switch resource if the performance index satisfies a bandwidth grant condition, wherein the performance index comprises a weighted combination of the one or more attributes, wherein the performance index comprises a predicted value of at least one of the one or more attributes, wherein the one or more attributes are filtered in accordance with a probabilistic filter.

11. The switching device of claim 10, wherein the switch resource is switching. fabric bandwidth.

* * * * *